(12) United States Patent
Huang et al.

(10) Patent No.: US 11,366,231 B2
(45) Date of Patent: Jun. 21, 2022

(54) SMART OPTICAL CABLE POSITIONING/LOCATION USING OPTICAL FIBER SENSING

(71) Applicant: NEC Laboratories America, Inc., Princeton, NJ (US)

(72) Inventors: Ming-Fang Huang, Princeton, NJ (US); Yuheng Chen, South Brunswick, NJ (US); Ting Wang, West Windsor, NJ (US)

(73) Assignee: NEC Corporation

( * ) Notice: Subject to any disclaimer, the term of this patent is extended or adjusted under 35 U.S.C. 154(b) by 74 days.

(21) Appl. No.: 16/660,699

(22) Filed: Oct. 22, 2019

(65) Prior Publication Data
US 2020/0124735 A1   Apr. 23, 2020

Related U.S. Application Data

(60) Provisional application No. 62/923,881, filed on Oct. 21, 2019, provisional application No. 62/749,151, filed on Oct. 23, 2018.

(51) Int. Cl.
*G01S 19/03* (2010.01)
*G01H 9/00* (2006.01)

(52) U.S. Cl.
CPC .............. *G01S 19/03* (2013.01); *G01H 9/004* (2013.01)

(58) Field of Classification Search
CPC ......... G01S 19/03; G01S 19/14; G01H 9/004; G01V 1/001
See application file for complete search history.

(56) References Cited

U.S. PATENT DOCUMENTS

| | | |
|---|---|---|
| 9,143,236 B1 | 9/2015 | Bartur et al. |
| 2009/0037485 A1 | 2/2009 | Radel et al. |
| 2015/0098673 A1* | 4/2015 | Barfoot ............... G01V 8/24 385/13 |
| 2016/0161632 A1 | 6/2016 | Barfoot et al. |

* cited by examiner

*Primary Examiner* — Tony Ko
(74) *Attorney, Agent, or Firm* — Joseph Kolodka

(57) ABSTRACT

Aspects of the present disclosure describe systems, methods and structures for determining any location on a deployed fiber cable from an optical time domain reflectometry (OTDR) curve using a movable mechanical vibration source to stimulate tiny vibration of fiber in deployed fiber cable along the cable route and a fiber sensing system at a central office to detect the vibration(s). Latitude and longitude of the location(s) of the vibration source is measured with a GPS device and a dynamic-OTDR distance is measured at central office (CO) simultaneously. The collected GPS location data and corresponding dynamic-OTDR distance data are paired and saved into a database. This saved data may be processed to graphically overlie a map thereby providing exact cable location on the map thereby providing carriers/service providers the ability to improve fiber fault location on a deployed fiber cable much faster and more accurately than presently possible using methods available in the art.

5 Claims, 16 Drawing Sheets

(a) Paired Data Measured

| OTDR Distance (m) | Latitude, Longitude |
|---|---|
| 5840 | 32.93102449 -96.68227025 |
| 5844 | 32.93102464 -96.68222998 |
| 5848 | 32.93102479 -96.68218971 |
| 5852 | 32.93102494 -96.68214943 |
| 5856 | 32.93102509 -96.68210916 |

Power

SMART OPTICAL CABLE POSITIONING/LOCATION USING OPTICAL FIBER SENSING

CROSS REFERENCE TO RELATED APPLICATIONS

This application claims the benefit of Untied States Provisional Patent Application Ser. No. 62/749,151 filed 23 Oct. 2018 and U.S. Provisional Patent Application Ser. No. 62/923,881 filed 21 Oct. 2019—the entire contents of both which are incorporated by reference as if set forth at length herein.

TECHNICAL FIELD

This disclosure relates generally to optical communications and optical sensing systems, methods, and structures. More particularly, it describes optical fiber sensing systems, method, and structures in conjunction with an existing or future telecommunications infrastructure to more effectively allocate length and position of optical fiber included therein.

BACKGROUND

As is known in the optical communications arts, great lengths of optical communications facilities—including optical fiber cables—have been installed or are planned to provide for the growing demand of global communications. Known further, such communications facilities may be located underground (e.g., in conduits), aerially (e.g., hung on poles) or installed inside buildings or other structures. Unfortunately, for certain facilities, a known accuracy of any optical cable installation location may approach 15-20% error as compared to a layout map and physical locations identified thereon. Such location errors continue to plague operators and technicians when maintenance is required resulting from—for example—a fiber cut.

SUMMARY

An advance in the art is made according to aspects of the present disclosure directed to improved systems, methods, and structures providing smart cable location using optical fiber sensing.

In sharp contrast to the prior art, systems, methods, and structures according to aspects of the present disclosure advantageously employ both distributed optical sensing and frequency source(s) to provide both optical cable length and physical position information simultaneously—instead of only length information as is practiced by the art and continues to plague servicing same.

Operationally, systems, methods and structures according to the present disclosure are useful for determining any location on a deployed fiber cable from an optical time domain reflectometry (OTDR) curve using a movable mechanical vibration source to stimulate tiny vibration of fiber in deployed fiber cable along the cable route and a fiber sensing system at a central office to detect the vibration(s). Latitude and longitude of the location(s) of the vibration source is measured with a GPS device and a dynamic-OTDR distance is measured at central office (CO) simultaneously. The collected GPS location data and corresponding dynamic-OTDR distance data are paired and saved into a database. This saved data may be processed to graphically overlie a map thereby providing exact cable location on the map thereby providing carriers/service providers the ability to improve fiber fault location on a deployed fiber cable much faster and more accurately than presently possible using methods available in the art.

BRIEF DESCRIPTION OF THE DRAWING

A more complete understanding of the present disclosure may be realized by reference to the accompanying drawing in which:

FIG. 1(A) and FIG. 1(B) shows schematic diagrams illustrating—at a high-level—a smart ground cable positioning system using fiber sensing technologies wherein FIG. 1(A) illustrates distributed sensing; and FIG. 1(B) illustrates cable location analysis including frequency detection, intensity measurement, and mapping, all according to aspects of the present disclosure;

FIG. 6(A) and FIG. 6(B) illustrate schematically our method and illustrative architecture according to the present disclosure in which: FIG. 6(A) is a schematic block diagram illustrating components and overall method to determine latitude and longitude of deployed optical fiber and FIG. 6(B) is a table of paired data including OTDR Distance and Latitude/Longitude data—all according to aspects of the present disclosure;

FIG. 7(A) and FIG. 7(B) illustrate schematically a fiber route selected for our experimental trial and trial equipment according to the present disclosure in which: FIG. 7(A) is a map indicating fiber route selected for trial and FIG. 7(B) is a photo-illustration showing illustrative fiber sensing system—all according to aspects of the present disclosure; and FIG. 8(A), FIG. 8(B) and FIG. 8(C) illustrate trial results for our method according to aspects of the present disclosure in which: FIG. 8(A) is a table of measured and paired GPS data with dynamic-OTDR distance(s); FIG. 8(B) illustrates mapping dynamic-OTDR on a geographic location; and FIG. 8(C) a computer generated map showing geographic location of dot in FIG. 8(B),—all according to aspects of the present disclosure.

Figure 1A:
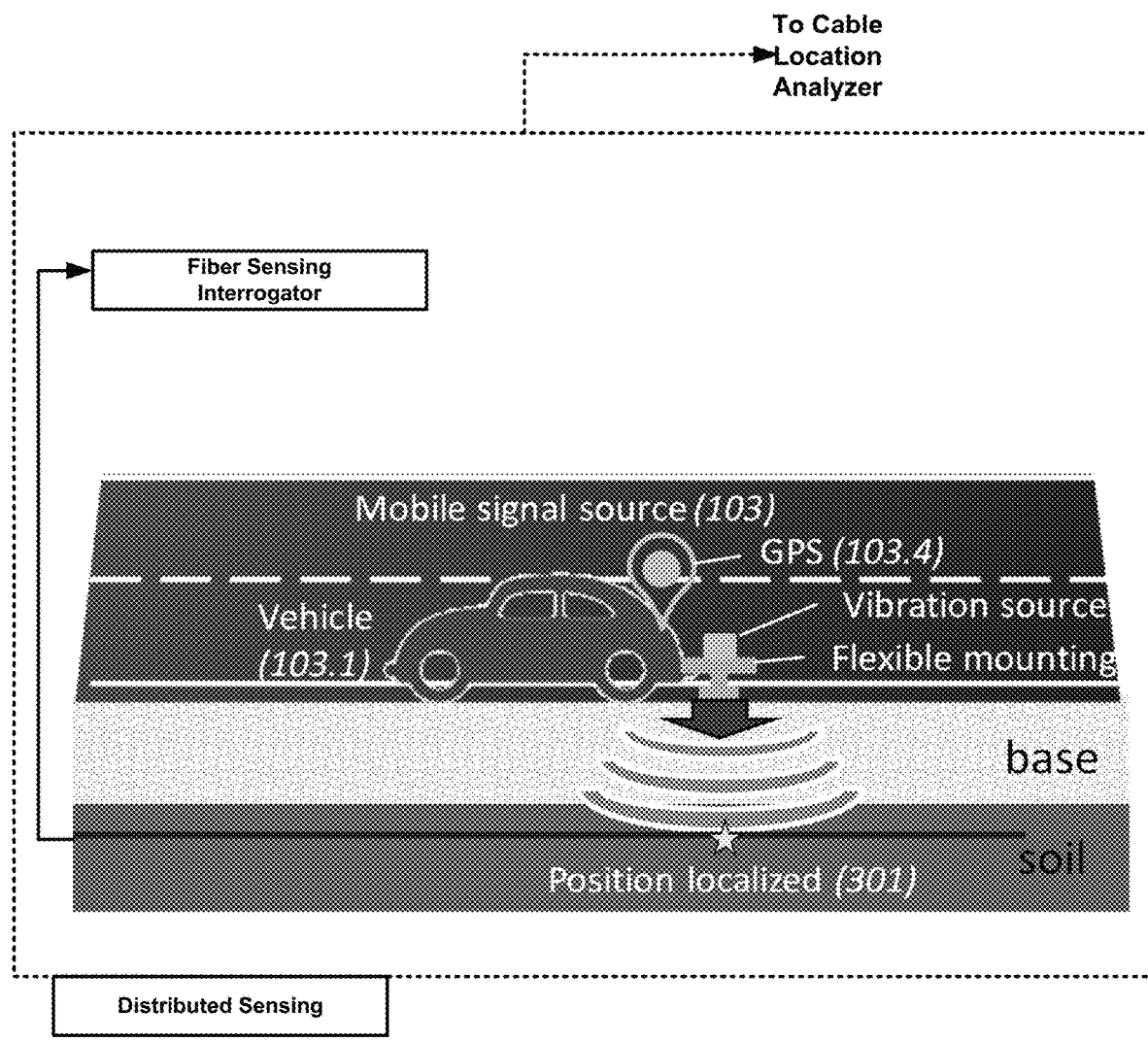

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that when servicing optical communications facilities including optical fiber cables, operators and technicians oftentimes will employ techniques such as optical time-domain reflectometry (OTDR) to measure—among other things—fiber length and loss. However, while OTDR does provide distance information it does not necessarily provide physical location of the cable. As such, even if it is determined that a cut or other defect is located at a $1000^{th}$ m of an optical cable—for example—it nevertheless may prove difficult to locate the actual physical position of that cable and its detected fault. As such, operators may employ trace wire, ground penetrating radar (GPR), and/or ground penetrating sonar (GPSon) technologies to identify the physical location of underground cables and/or conduits in which they are frequently placed. As will be appreciated by those skilled in the art, such technologies and techniques employing same may provide physical location information, but do not provide length information about any fault condition.

Figure 1B:
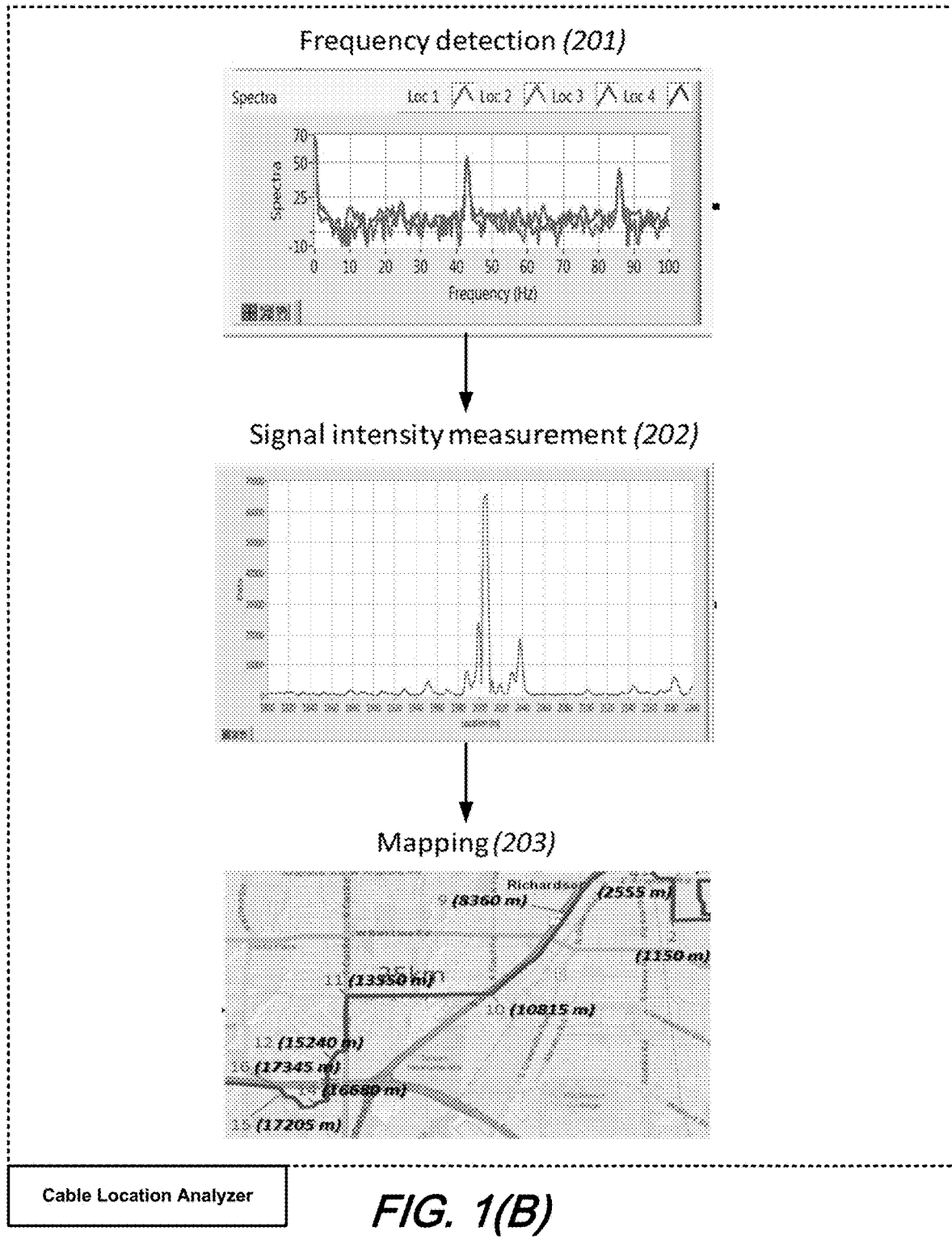

FIG. 1(A) and FIG. 1(B) shows schematic diagrams illustrating—at a high-level—a smart ground cable positioning system using fiber sensing technologies wherein FIG. 1(A) illustrates distributed sensing; and FIG. 1(B) illustrates cable location analysis including frequency detection, intensity measurement, and mapping, all according to aspects of the present disclosure.

With simultaneous reference to those figures, it may be observed that an illustrative arrangement for a cable positioning system by optical fiber sensing is shown therein in FIG. 1(A) and FIG. 1(B). As may be further observed, such arrangement may be conveniently viewed as two high-level components or parts namely, sensing/data collection (FIG. 1(A)) and data analysis/location analyzer (FIG. 1(B)).

With respect to the sensing/data collection—and in particular distributed sensing/data collection such as that illustratively shown in FIG. 1(A), such distributed sensing/data collection may included any of a variety of technologies including distributed vibration sensing (DVS) and/or distributed acoustic sensing (DAS) operating via optical fiber cable(s) such as that illustrated in the figure. Operationally, such systems and technologies may include sensing transmitter(s) and receiver(s) that may conveniently integrated in a fiber sensing interrogator located in a control office that—as will be readily appreciated by those skilled in the art—may be physically located either proximate to or quite remote from a roadway/highway or other conduit at which the sensing/data collection takes place.

Operationally, a mobile signal source—such as a vehicle shown—will move/relocate along a suspected optical fiber cable pathway such as may be located under a roadway while providing a vibrational and/or acoustic signal/excitation to the roadway. As the vehicle and vibrational/acoustic source(s) move along the optical fiber, the fiber sensing interrogator will monitor signals received from the optical fiber. Such sensing may be either continuous and/or periodic—so long as any monitoring period is sufficiently short to identify a location at which the vibrational/acoustic source is located. Further refinement to the location may include a global positioning system receiver/transmitter resident with the vehicle.

For the distributed fiber sensing illustrated and as noted—technologies employed for the operation may advantageously include the distributed vibration sensing (DVS) or distributed acoustic sensing (DAS) noted, wherein such DVS and/or DAS signals are active through the optical fiber cable. Sensing transmitter and/or receiver are shown located in a fiber sensing interrogator, in turn located in a control office which may be located far from the roadway for remote monitoring. Mobile signal source includes a vehicle, a vibration source and a flexible mounting arrangement. The vibration source is configured as part of a flexible mounting plate attaching to vehicle, such that it may operationally strike or otherwise hit the ground (roadway) thereby generating vibration signals. Note that the vibration source may be any of a variety of mechanical vibration sources including electric motor driven vibrators, mechanically driven vibrators, etc.

During operation, the vehicle may advantageously be moving (driving or being driven) along the entire cable route thereby providing great flexibility and, of course, mobility to precisely and accurately survey the length of the cable and precisely locate any faults within that cable.

Figure 2A:
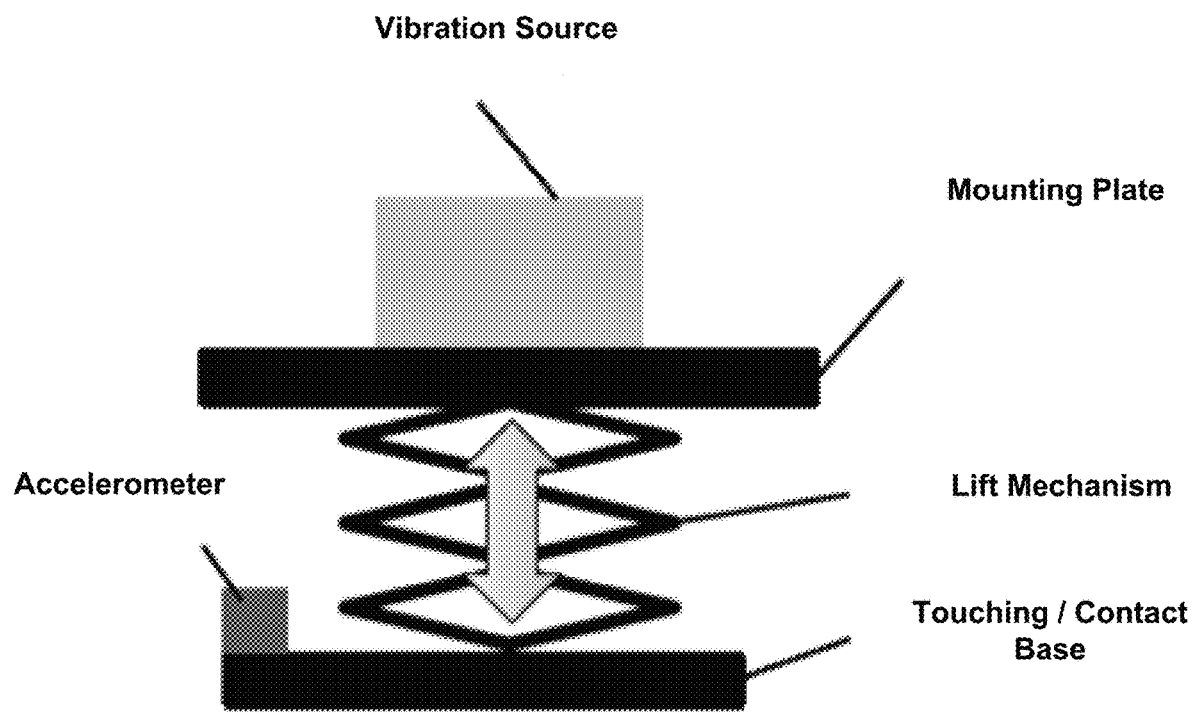
FIG. 2(A) shows a schematic diagram illustrating a flexible mounting for a vibration source for use in a smart ground cable positioning system according to aspects of the present disclosure.
Figure 2B:
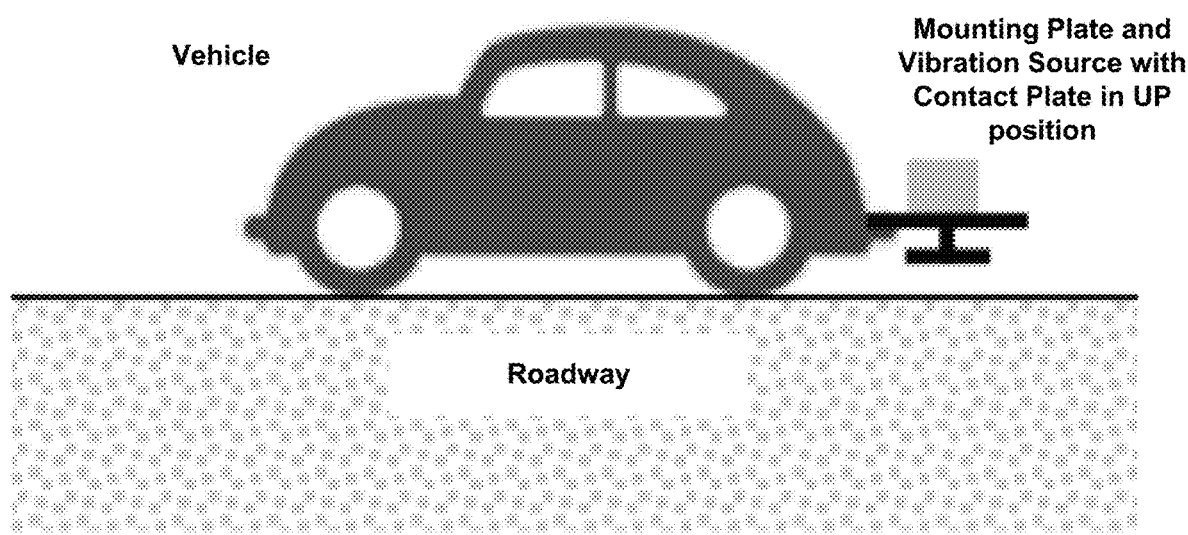
FIG. 2(B) shows a schematic diagram illustrating a flexible mounting for a vibration source for use in a smart ground cable positioning system wherein a mounting plate is in a lifted-up position according to aspects of the present disclosure.
Figure 2C:
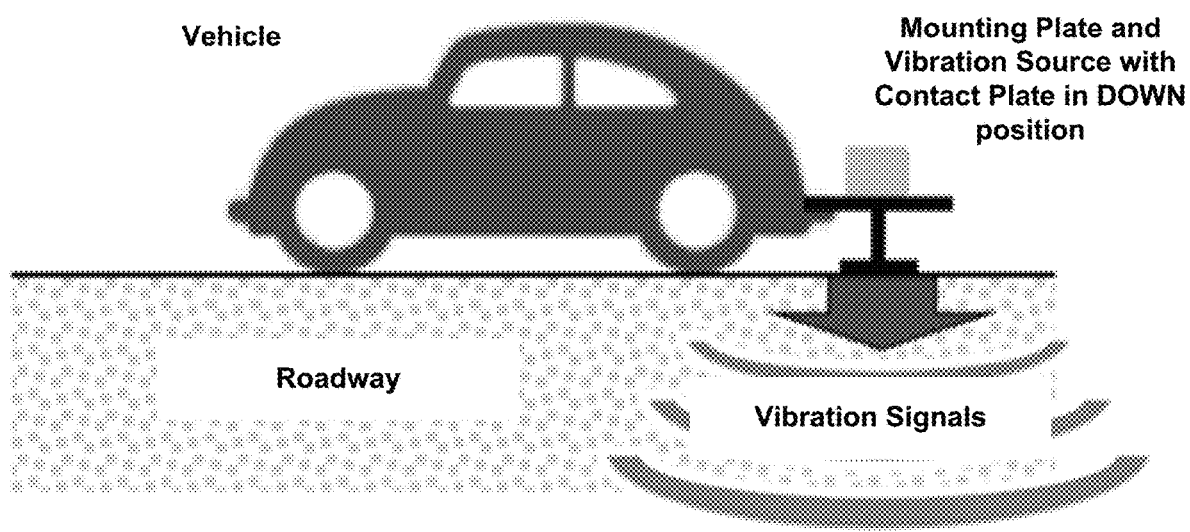
FIG. 2(C) shows a schematic diagram illustrating a flexible mounting for a vibration source for use in a smart ground cable positioning system wherein a mounting plate is in a dropped position for testing according to aspects of the present disclosure.

FIG. 2(A) shows a schematic diagram illustrating a flexible mounting for a vibration source for use in a smart ground cable positioning system according to aspects of the present disclosure;

FIG. 2(B) shows a schematic diagram illustrating a flexible mounting for a vibration source for use in a smart ground cable positioning system wherein a mounting plate is in a lifted-up position according to aspects of the present disclosure;

FIG. 2(C) shows a schematic diagram illustrating a flexible mounting for a vibration source for use in a smart ground cable positioning system wherein a mounting plate is in a dropped position for testing according to aspects of the present disclosure;

As may be observed from these figures, the flexible mounting as illustratively shown includes a mounting plate, a lift mechanism, a touching base, and an accelerometer. The mounting is attached to a vehicle that is capable of moving or otherwise relocating such that measurements may be made at different physical locations along a suspected/known fiber pathway.

During operation, the touching base is lifted when the vehicle is moving as illustratively shown in FIG. 2(B). When performing tests, the base is dropped such that it touches/contacts the ground to be tested. Once contacted, mechanical/vibrational signals are produced and transmitted into the contacted ground as illustratively shown in FIG. 2(C). Including an accelerometer provides additional data useful in frequency detection and as a reference for optical fiber sensing.

As noted previously, the vehicle including the flexibly mounted vibration source and GPS is moved along a length of the cable while generating vibrational signals that are transmitted to the cable. From OTDR and vibrational data received by that interrogator and subsequently analyzed, fault or other information pertaining to the optical cable may be advantageously determined.

As will be appreciated by those skilled in the art, an entire set of sensing data is provided to the cable analyzer (see, FIG. 1(B)) wherein cable location analyzer processes frequency detection and signal intensity measurements. Those skilled in the art will further understand and appreciate that to accurately and precisely identify positioning vibrational signals transmitted into roadway/cable, it is necessary to distinguish signals generated by vibration source from those environmentally generated such as roadway or other traffic, etc. Subsequent to any frequency identification from mobile vibrational source/accelerometer and fiber sensing interrogator, the source is located relative to a length of the cable from an intensity measurement. With this data—taken in conjunction with coordinate information received from GPS co-located with mobile vibrational source on vehicle, a physical location and fiber length may be determined and subsequently mapped collectively.

While those skilled in the art will certainly appreciate that systems, methods, and structures according to aspects of the present disclosure advantageously provide data necessary to locate a vibrational source along a optical fiber pathway and subsequently that cables' geolocation, a somewhat modified technique may be applied to aerial cables as well.

Figure 3:
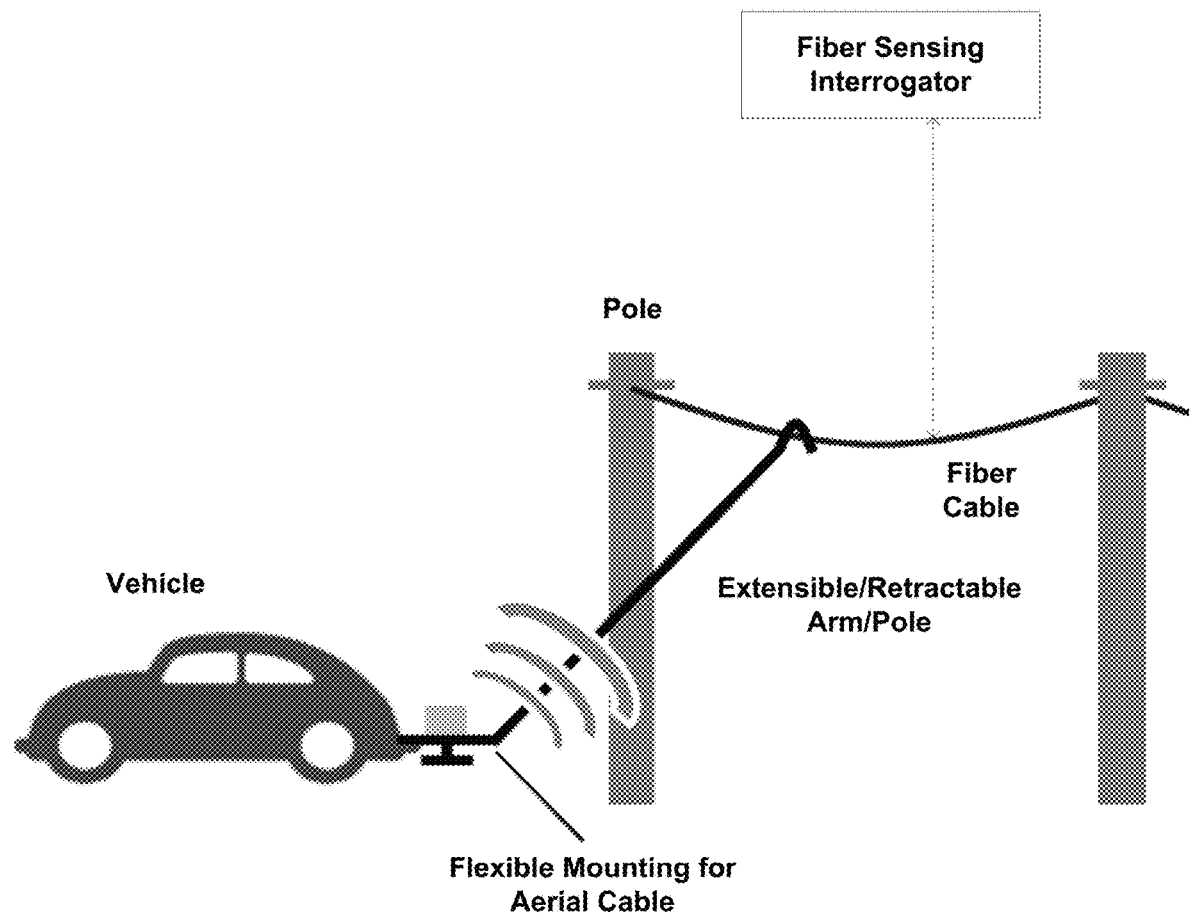
FIG. 3 is a schematic diagram illustrating a smart aerial cable positioning system using fiber sensing technologies according to aspects of the present disclosure.

FIG. 3 is a schematic diagram illustrating a smart aerial cable positioning system using fiber sensing technologies according to aspects of the present disclosure. With reference to that figure, it may be observed that an aerial cable may be located as shown in that figure. Similar to the operation for underground terrestrial cables, for an aerial facility a vibration source is located on a flexible mounting plate attached to a vehicle. The vibration source is activated such that vibration signals are generated in the cable and analyzed as described previously.

Figure 4A:
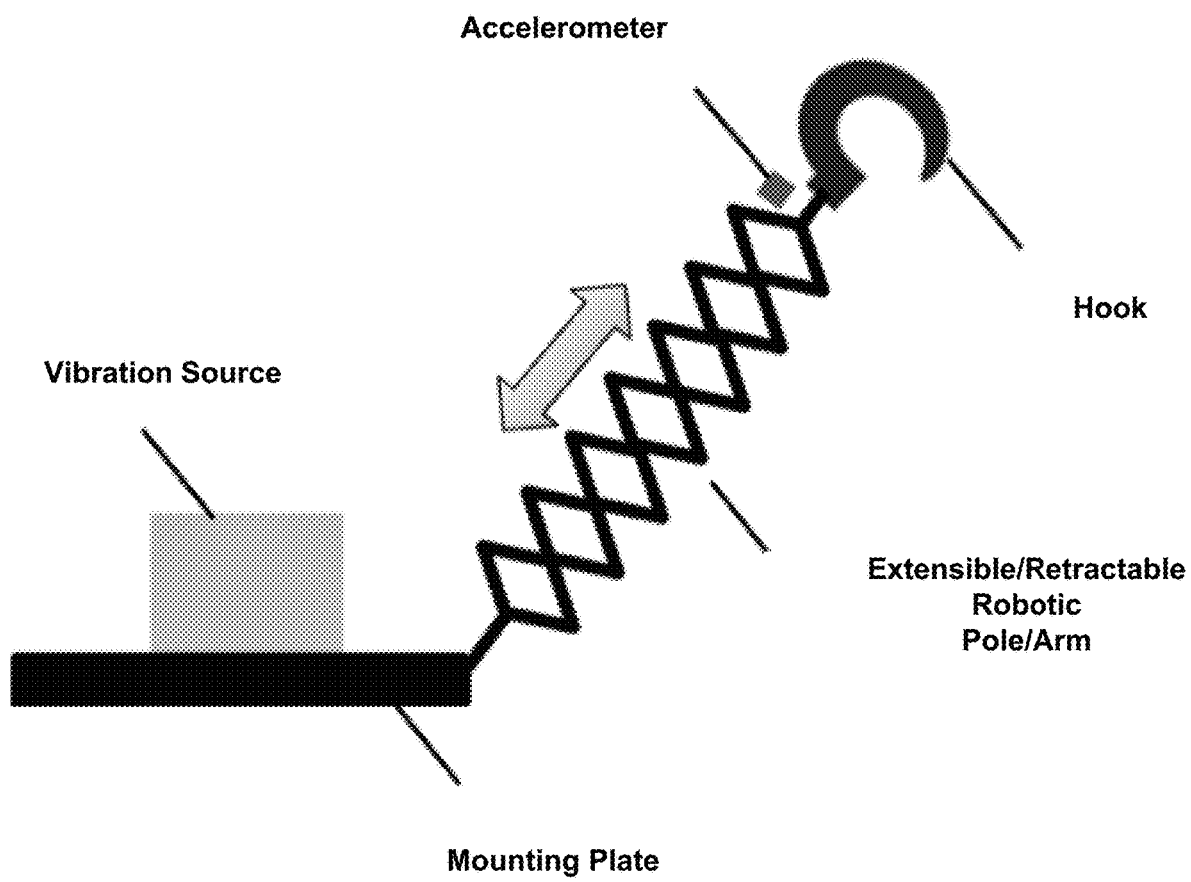
FIG. 4(A) shows a schematic diagram illustrating a flexible mounting for an aerial cable vibration source for use in a smart aerial cable positioning system according to aspects of the present disclosure.

FIG. 4(A) shows a schematic diagram illustrating a flexible mounting for an aerial cable vibration source for use in a smart aerial cable positioning system according to aspects of the present disclosure.

Figure 4B:
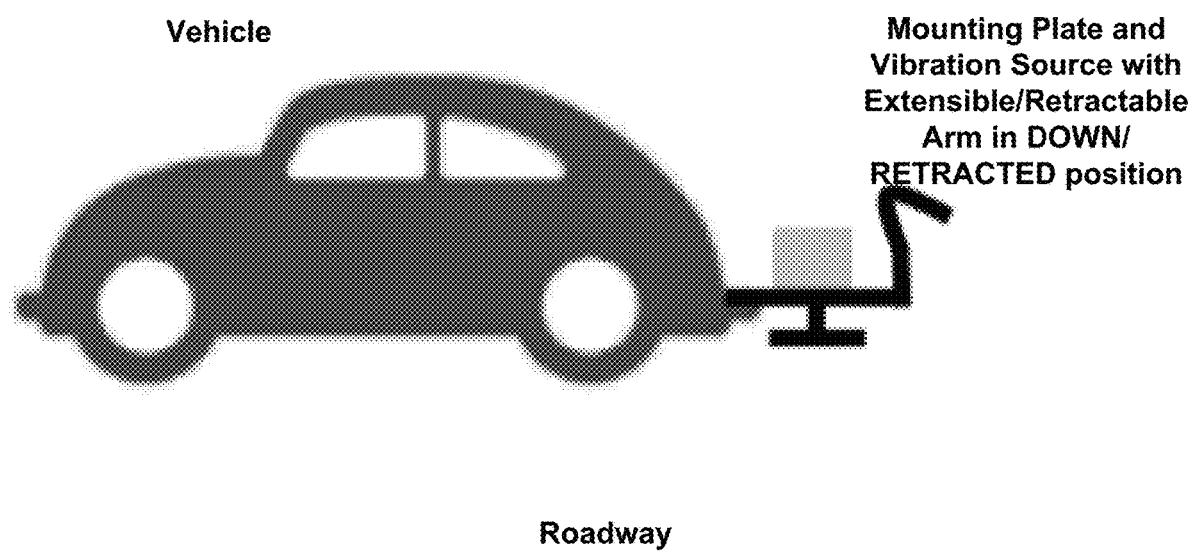
FIG. 4(B) shows a schematic diagram illustrating a flexible mounting for an aerial cable vibration source for use in a smart aerial cable positioning system wherein an arm of the system is in a lowered position according to aspects of the present disclosure.

FIG. 4(B) shows a schematic diagram illustrating a flexible mounting for an aerial cable vibration source for use in a smart aerial cable positioning system wherein an arm of the system is in a lowered position according to aspects of the present disclosure.

Figure 4C:
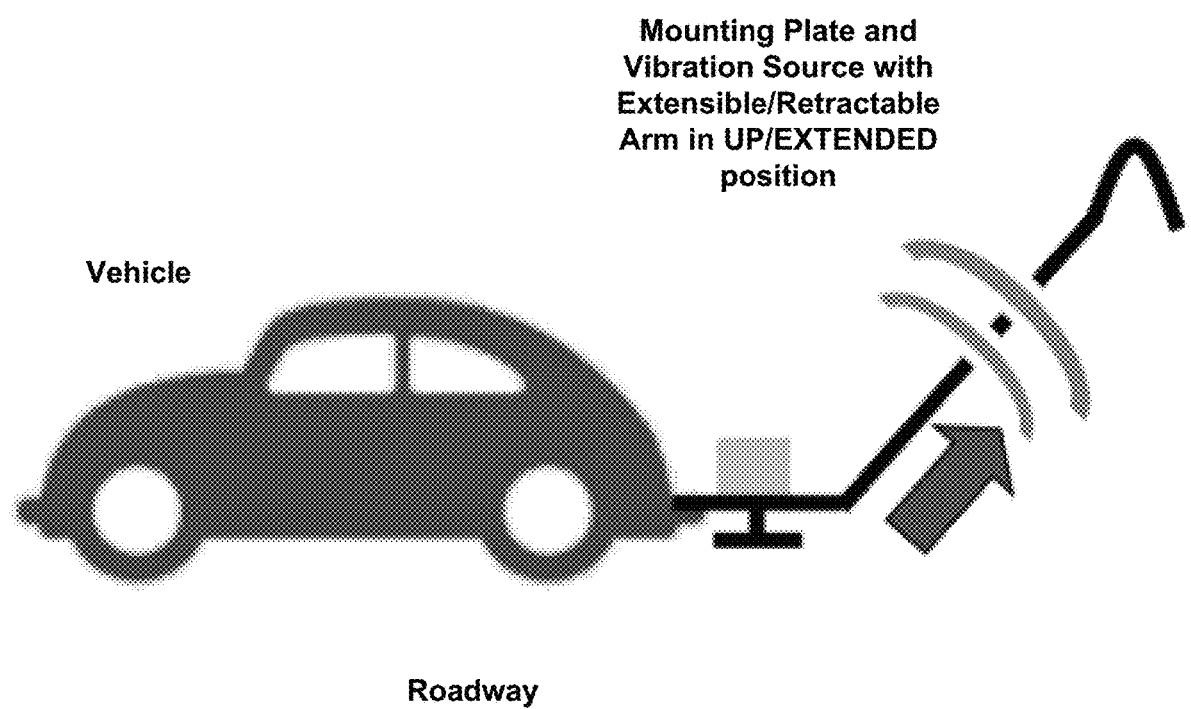
FIG. 4(C) shows a schematic diagram illustrating a flexible mounting for an aerial cable vibration source for use in a smart aerial cable positioning system wherein the arm is in a raised position for testing according to aspects of the present disclosure.

FIG. 4(C) shows a schematic diagram illustrating a flexible mounting for an aerial cable vibration source for use in a smart aerial cable positioning system wherein the arm is in a raised position for testing according to aspects of the present disclosure.

A more detailed illustration of a flexible mounting arrangement for vibrational signal generation as employed with an aerial cable is shown in FIG. 4(A) which is illustratively shown including a mounting plate, extensible/retractable robotic arm, a hook and an accelerometer. As further illustrated in FIG. 4(B), the arm is lowered as the vehicle moves between poles. When performing tests, the arm is raised and mechanically coupled to the aerial cable via the hook. As illustratively shown in FIG. 4(C), vibration signals generated from the vibration source are conveyed to the aerial cable(s) via the extended arm.

Figure 5:
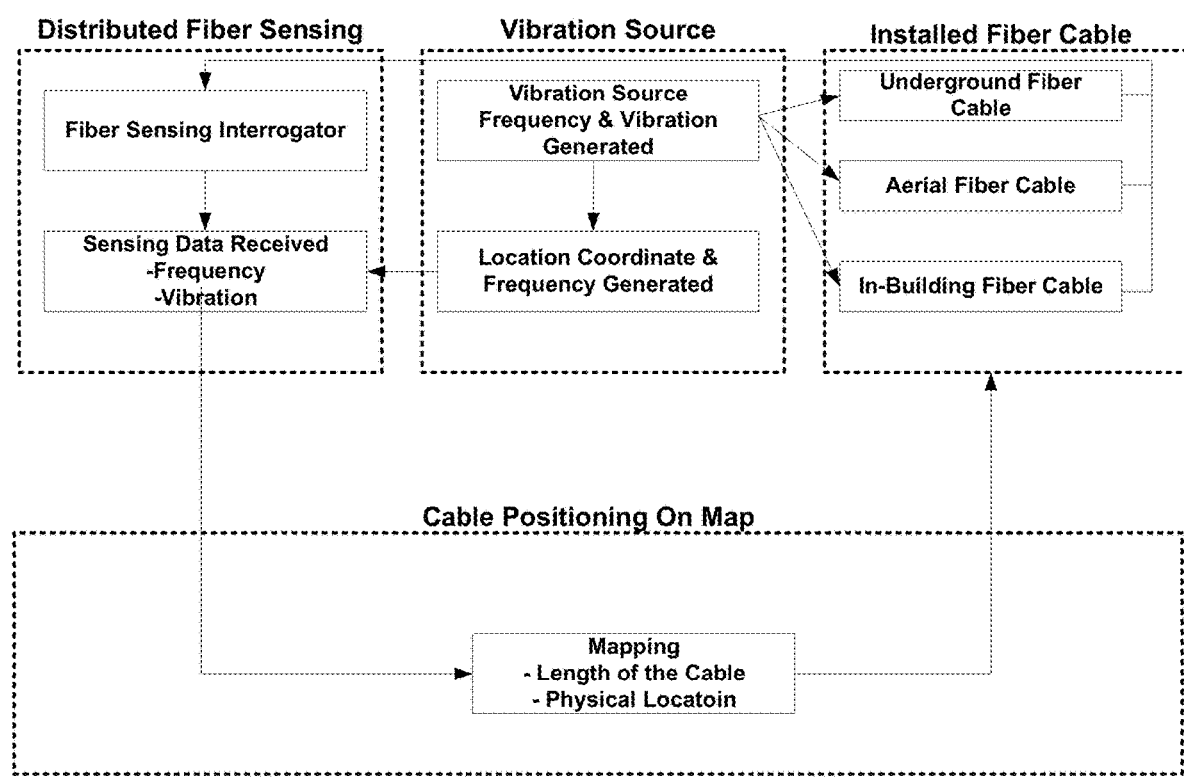
FIG. 5 is a block flow diagram illustrating an overall operation of smart cable positioning including distributed fiber sensing operation, vibration source, installed fiber cable location, and cable positioning on map functions—according to aspects of the present disclosure.

A flow diagram illustrating overall operation of systems, methods, and structures according to aspects of the present disclosure is shown schematically in FIG. 5. As illustrated therein, distributed fiber sensing data is collected along a length of the fiber whether that cable be underground, aerial, or an in-building fiber cable. A generally mobile, vibration source imparts vibration signals (mechanical vibrations) along the length of the cable that is subsequently controlled/received by a fiber sensing interrogator. Any sensing data so received including both frequency and/or vibration data is then processed from which the cable position at which the vibrations are applied are mapped and subsequently provided as output. The vibration signals, in conjunction with OTDR measurements made concurrently and/or simultaneously, advantageously provide length and location information that may be mapped for further reference. Of particular advantage, such data processing/analysis may be performed at a central office or via cloud computing mechanisms. Based on coordinates determined from vibration source(s), GPS information associated with source vehicle, a location of the cable may be determined thereby realizing our smart cable positioning.

With this operational background and description in place, we now describe some experimental operation and experimental results realized by systems, methods, and structures according to aspects of the present disclosure. As we shall experimentally show and describe, our novel method, systems, and structures may advantageously determine any location on deployed fiber cables which are then mapped with an OTDR curve to a geographical map. Significantly—and in further sharp contrast to the prior art—our method exhibits 4-m accuracy for buried cables and is able to provide an exact location for pole supported aerial cables. With this method in hand, network operation teams will be able to pinpoint fiber fault(s) quickly and accurately based on dynamic-OTDR measurement results. Of further importance and distinction, our method will greatly enhance operation teams work efficiency when diagnosing, searching, and subsequently fixing/repairing fiber problems existing in-field.

In describing our inventive method, we note that one aspect of our method is that it may determine the latitude and longitude of any location along a deployed optical fiber cable ("Lat-Long" Method).

Figures 6A, 6B:
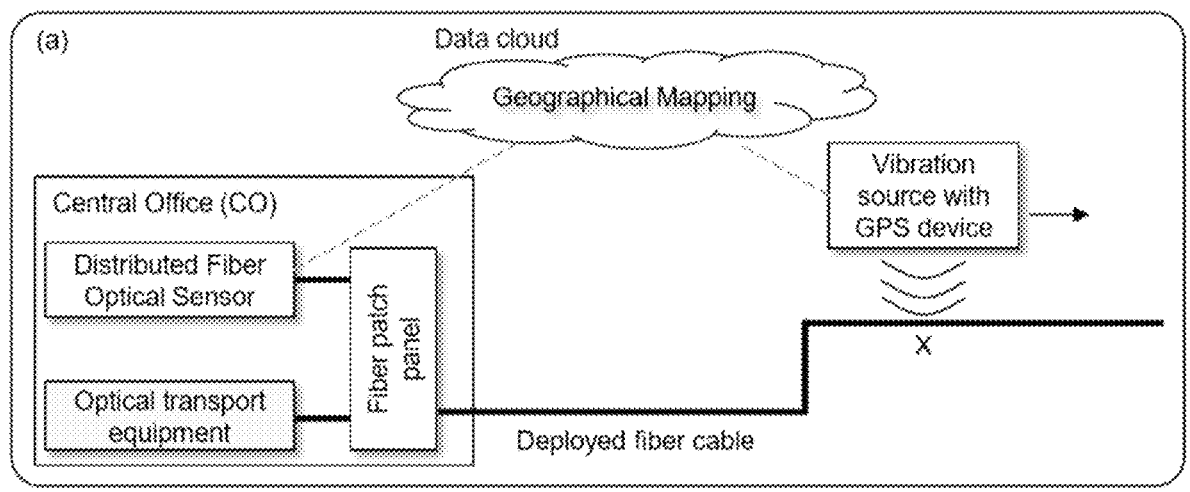

An experimental illustration of our method may be understood with simultaneous reference to FIG. 6(A), and FIG. 6(B). As noted previously during our general discussion and now in describing our experimental operation, it may be understood that key components of our method include (1) a portable (mobile) vibration source configured to move along a path on which the cable is deployed to stimulate tiny localized vibration(s) of an optical fiber located inside the deployed cable. (Shown as an exemplary location "X" in FIG. 6(A)). Additionally, (2) a GPS (Global Positioning System) device, which moves together with the vibration source, and is configured to send latitude and longitude coordinates or other data indicative of its current location to a "data cloud". (Note that "data cloud"—as that term is used herein—is indicative of any of a number of known data processing/collection/storage/retrieval facilities—including computer programs—that are generally remote from the mobile vibration source/GPS and accessible by any of a number of wireless/wired/combination wired-wireless techniques/technologies known in the art). Furthermore, (3) a distributed fiber optical sensor, which may advantageously reside in a Central Office (CO) and is connected to outside plant cable (OSP), which in turn carries telecom data traffic sent by optical transport equipment, to detect OTDR distance information between the CO and a location at which the vibration source is simulating the cable at that moment. At the same time, fiber sensing system sends dynamic-OTDR distance data to the data cloud for storage and subsequent processing.

Once received, (4) data cloud pairs the GPS data and the dynamic-OTDR distance data—which are collected simultaneously—and saves the paired data into a database. A GUI (graphical user interface) can be employed to show a fiber location on a geographic map based on a given OTDR distance.

Once such data is collected, (5) when an operation team needs to find the location of a fiber fault on the deployed cable, they can use an OTDR at the CO to measure the distance to a fault—for example—then they can input the distance information into the database, and the exact location with coordinate of the fault will be displayed on a geographic map with the GUI. The technology of the distributed fiber optical sensing system may advantageously employ Rayleigh backscattering to provide a measured distance of any fiber vibrations.

Figure 7A:
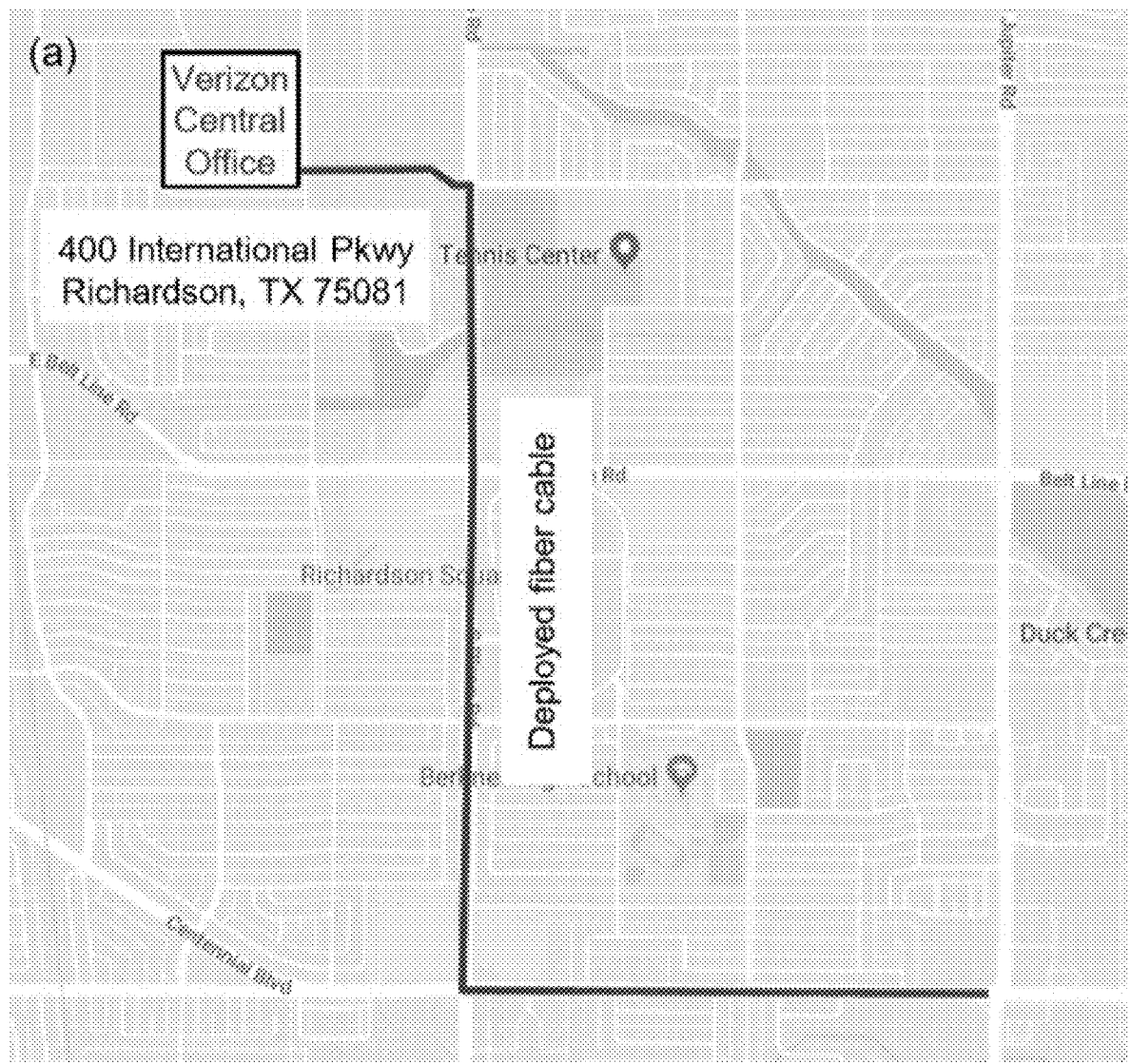
Figure 7B:
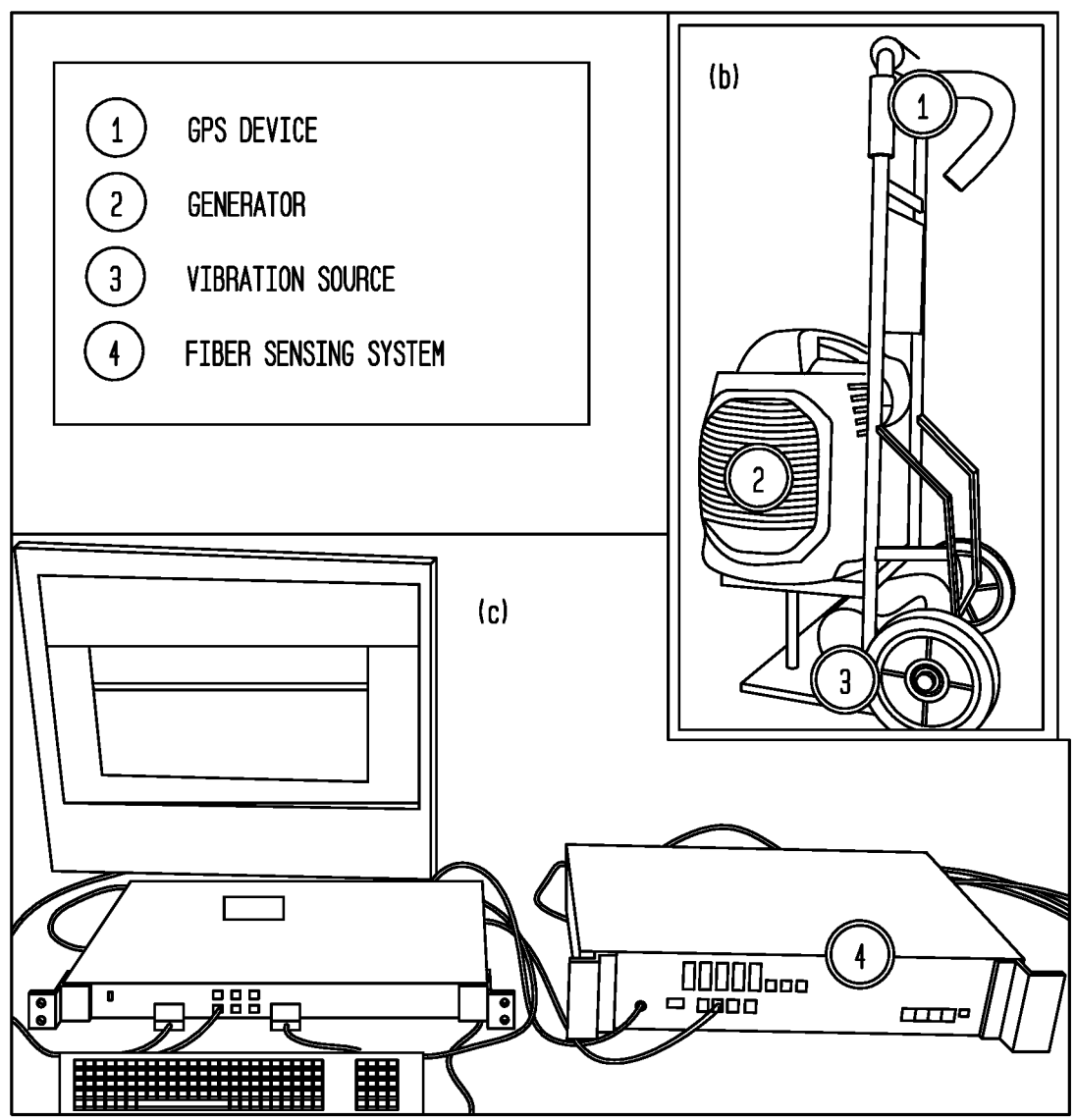

An experimental trial cable route for our trial is shown graphically in FIG. 7(A). The fiber route is about 12 km long and its deployment path is shown on the map in the figure. A portable/mobile mechanical vibration source is used to stimulate tiny vibration of fiber in the deployed cable. For the purposes of our experimental trial, it is powered by a portable generator, as shown in FIG. 7(B). A GPS device is used to record the latitude and longitude of its current location. A fiber sensing system is installed in a central office to measure the dynamic-OTDR distance of the stimulated localized fiber vibration events in field, as shown in the figure.

During the trial, the vibration source was towed along the path of the deployed fiber cable. The trial fiber cable route is composed of buried cable and aerial cable sections. For the buried cable sections, the cable is about 36-48 inches underground. For the aerial cable sections, the cable is installed on utility poles. The vibration source moves along the cable route within a range of 6 feet from the cable in horizontal direction for the buried cable sections. For the aerial cable sections, the vibration source moves pole-to-pole along the straight lines linking adjacent poles. The GPS device is used to record the latitude and longitude data for the current location of the vibration source. At the same time, the fiber sensing system in the central office records the measured dynamic-OTDR distance of the stimulated vibration event in the deployed cable. After all data of the trial route are collected, the GPS data and the dynamic-OTDR data are paired and saved into a database for future use.

During the trial we collected more 2,500 pairs of latitude-longitude data and OTDR distance data for a total length of 12-km deployed fiber cables. Examples of the collected and paired data are shown tabular form in FIG. 8(A). For the buried cable, a 4-m location accuracy is obtained. For the aerial cable, the locations of the poles are determined with a 4-m accuracy and the locations of the cable segment between two poles are estimated based the locations of the two poles.

Figure 8B:
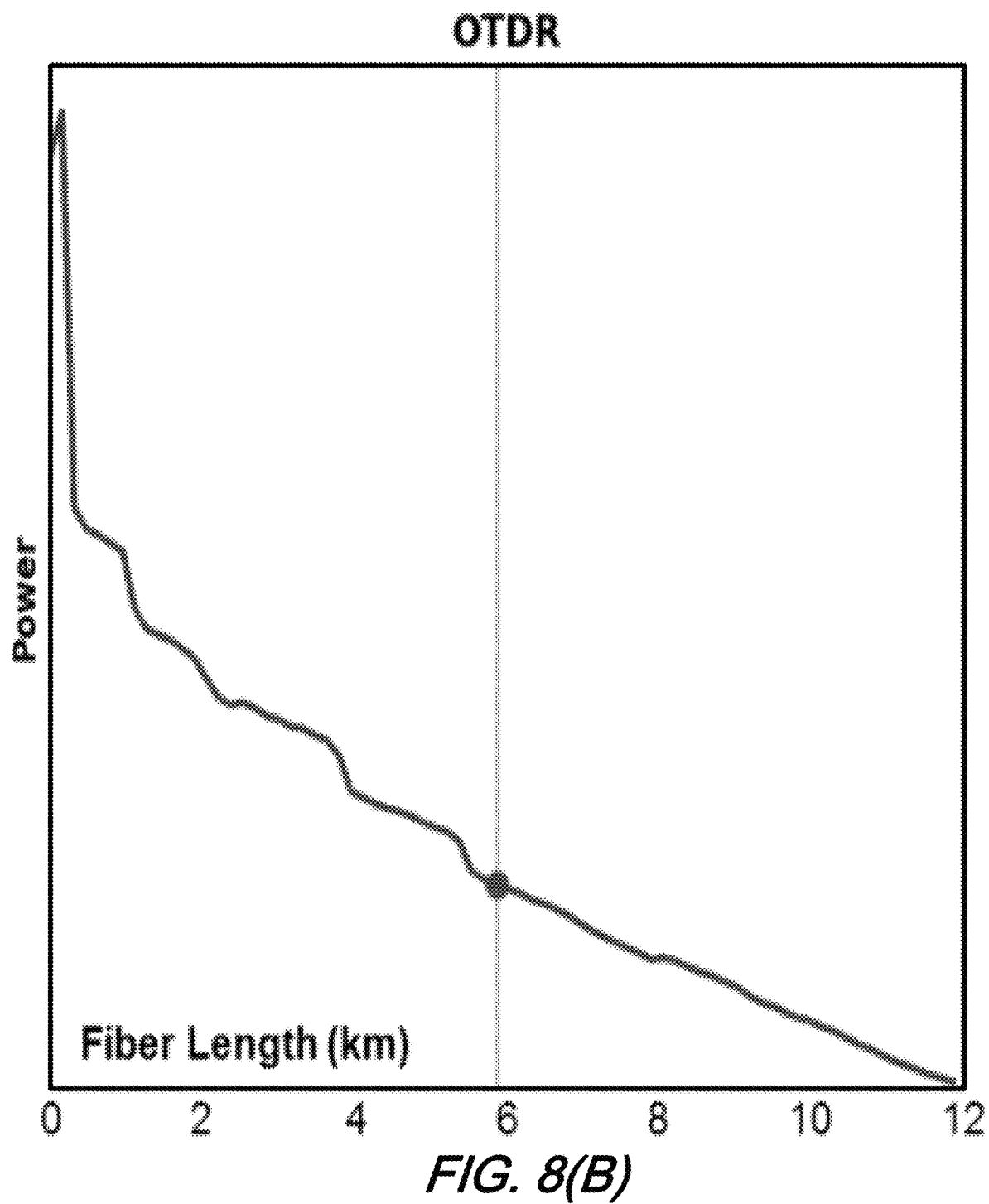
Figure 8C:
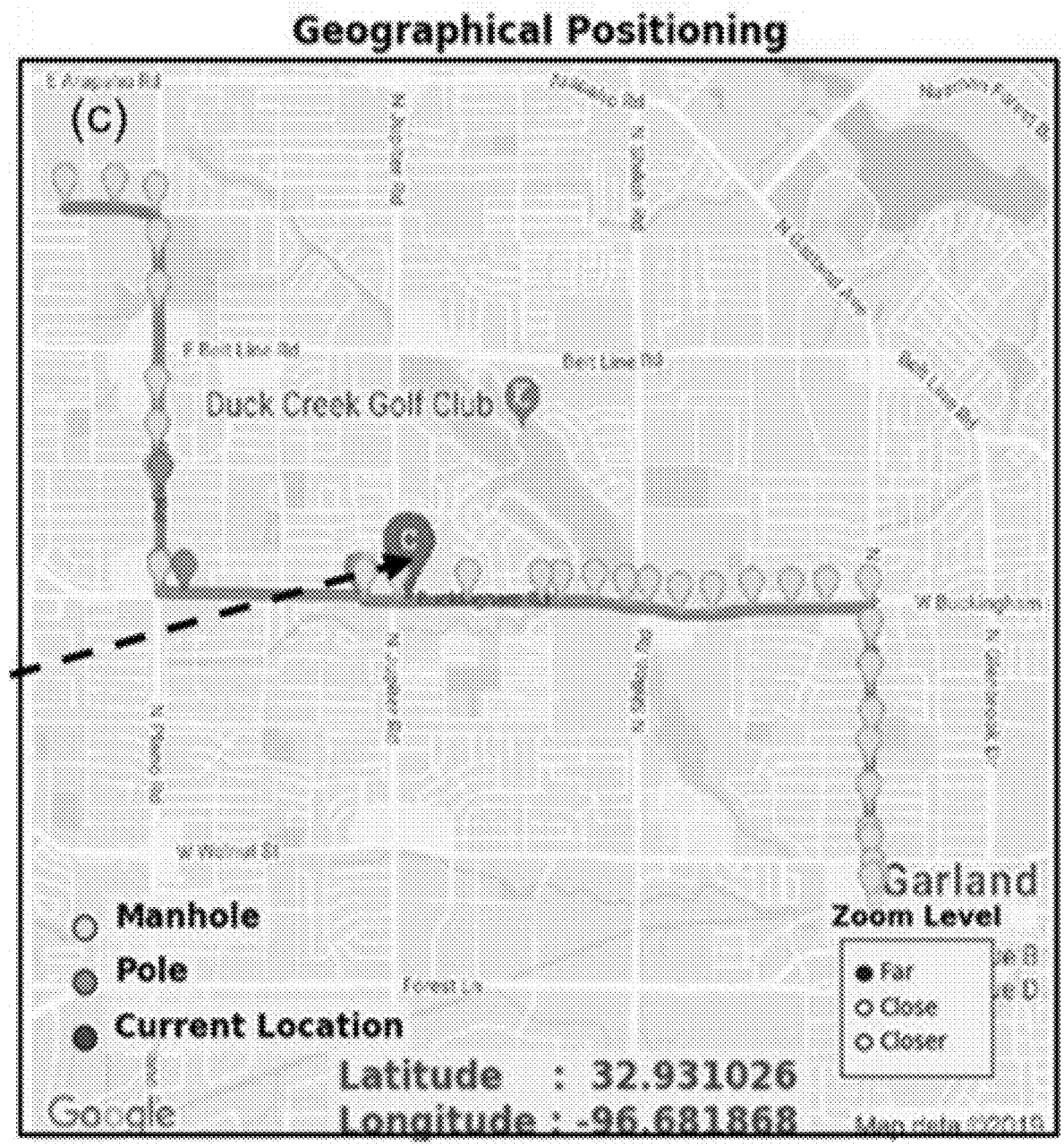

As a result of our inventive method and results indicate—for aerial cable—as long as the location of poles can be determined, operations teams are able to locate fiber faults between poles easily. As noted, FIG. 8(A) shows examples of the collected and paired GPS location data with dynamic-OTDR distance. FIG. 8(B) shows a normal OTDR curve and FIG. 8(C) shows a mapping of dynamic-OTDR to a geographical location on computer-generated map.

A user friendly GUI has been developed for demonstration of the method with the data collected during this field trial. The GUI simulates the real environment in which how a field operation teams uses the paired data to find a cable location quickly and accurately. As shown in FIG. 8(C), for a given OTDR distance, the GUI provides the corresponding geographic location on the Google map immediately. The GUI and the database are now available for potential users of the new method to play with it.

In view of our disclosure herein, those skilled in the art will now recognize and appreciate that our method may be readily implemented by network service providers. For each deployed fiber cable, a carrier/provider only needs to collect and pair once its latitude-longitude data and dynamic-OTDR distance data. When a deployed fiber cable has some changes due to city constructions or other reasons, only the data of the impacted cable needs to be re-mapped while data of other fiber cables are still intact. A robotic vibration source may be used to crawl fiber cable paths and save GPS data automatically. An optical switch may be used to switch the fiber vibration detection system to different fiber cables ended at a CO and record dynamic-OTDR distance data automatically as well. Once a database is generated, operation teams can pinpoint fiber fault locations much faster and more accurately than can be performed today by prior art methods.

Conclusions For the first time we demonstrated in field that any location on a deployed fiber cable can be determined by using a normal OTDR curve based on our newly developed "cable lat-long" method. The method uses a movable mechanical vibration source to stimulate tiny vibration of fiber in deployed cable along a cable route and a fiber sensing system at a central office to detect the vibration. Latitude and longitude of the current location of the vibration source is measured with a GPS device and a dynamic-OTDR distance is measured at the CO at the same time. The collected GPS location data and corresponding dynamic-OTDR distance data are paired and saved into a database. With this new method, operation teams of telecom network service providers can determine any location of a fiber fault on deployed fiber cable much faster and more accurate than they can today. This field trail proves that this new method has a great potential to improve network operation efficiency in near future.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for locating deployed optical fiber cable, said method comprising:
stimulating mechanical vibrations along a length of the deployed optical fiber cable through the effect of a mechanical vibration source having a global positioning system (GPS) co-located with the mechanical vibration source;
sensing remotely the mechanical vibrations so stimulated through the effect of a dynamic-optical-time-domain-reflectometry (OTDR) system and determining optical fiber cable distance information from the sensed mechanical vibrations;
receiving, simultaneously with the remote sensing, latitude and longitude coordinates of the GPS co-located with the mechanical vibration source;
pairing the optical fiber cable distance information with the GPS latitude and longitude coordinates; and
graphically outputting the paired distance information and GPS latitude and longitude coordinates on a computer-generated map;
wherein the mechanical vibration source is mobile;
wherein the mechanical vibration source is moved after a pairing of distance and GPS latitude and longitude is performed; and
wherein the deployed optical fiber cable is aerial.

2. A method for locating deployed optical fiber cable, said method comprising:
stimulating mechanical vibrations along a length of the deployed optical fiber cable through the effect of a mechanical vibration source having a global positioning system (GPS) co-located with the mechanical vibration source;
sensing remotely the mechanical vibrations so stimulated through the effect of a dynamic-optical-time-domain-reflectometry (OTDR) system and determining optical fiber cable distance information from the sensed mechanical vibrations;
receiving, simultaneously with the remote sensing, latitude and longitude coordinates of the GPS co-located with the mechanical vibration source;
pairing the optical fiber cable distance information with the GPS latitude and longitude coordinates; and
graphically outputting the paired distance information and GPS latitude and longitude coordinates on a computer-generated map;
wherein the mechanical vibration source is mobile;
wherein the mechanical vibration source is moved after a pairing of distance and GPS latitude and longitude is performed;
wherein the deployed optical fiber cable is aerial; and
wherein the graphical output includes locations of poles aerially supporting the deployed optical fiber cable.

3. A method for locating deployed optical fiber cable, said method comprising:
stimulating mechanical vibrations along a length of the deployed optical fiber cable through the effect of a mechanical vibration source having a global positioning system (GPS) co-located with the mechanical vibration source;
sensing remotely the mechanical vibrations so stimulated through the effect of a dynamic-optical-time-domain-reflectometry (OTDR) system and determining optical fiber cable distance information from the sensed mechanical vibrations;
receiving, simultaneously with the remote sensing, latitude and longitude coordinates of the GPS co-located with the mechanical vibration source;
pairing the optical fiber cable distance information with the GPS latitude and longitude coordinates; and
graphically outputting the paired distance information and GPS latitude and longitude coordinates on a computer-generated map;
wherein the paired optical fiber cable distance information and the GPS latitude and longitude coordinates are stored remotely in a database; and
wherein the graphical output includes an indicia of a location of a fault within the optical fiber cable.

4. A method for locating deployed optical fiber cable, said method comprising:
stimulating mechanical vibrations along a length of the deployed optical fiber cable through the effect of a mechanical vibration source having a global positioning system (GPS) co-located with the mechanical vibration source;
sensing remotely the mechanical vibrations so stimulated through the effect of a dynamic-optical-time-domain-reflectometry (OTDR) system and determining optical fiber cable distance information from the sensed mechanical vibrations;
receiving, simultaneously with the remote sensing, latitude and longitude coordinates of the GPS co-located with the mechanical vibration source;
pairing the optical fiber cable distance information with the GPS latitude and longitude coordinates; and
graphically outputting the paired distance information and GPS latitude and longitude coordinates on a computer-generated map;
wherein the mechanical vibration source is mobile;
wherein the mechanical vibration source is moved after a pairing of distance and GPS latitude and longitude is performed;
wherein the deployed optical fiber cable is underground; and
wherein the mechanical vibration source is mounted on a vehicle and includes a retractable/extensible vibration pad that contacts the ground under which the deployed optical fiber cable is buried.

5. A method for locating deployed optical fiber cable, said method comprising:
stimulating mechanical vibrations along a length of the deployed optical fiber cable through the effect of a mechanical vibration source having a global positioning system (GPS) co-located with the mechanical vibration source;
sensing remotely the mechanical vibrations so stimulated through the effect of a dynamic-optical-time-domain-reflectometry (OTDR) system and determining optical fiber cable distance information from the sensed mechanical vibrations;
receiving, simultaneously with the remote sensing, latitude and longitude coordinates of the GPS co-located with the mechanical vibration source;

pairing the optical fiber cable distance information with the GPS latitude and longitude coordinates; and graphically outputting the paired distance information and GPS latitude and longitude coordinates on a computer-generated map;

wherein the mechanical vibration source is mobile;

wherein the mechanical vibration source is moved after a pairing of distance and GPS latitude and longitude is performed;

wherein the deployed optical fiber cable is aerial; and wherein the mechanical vibration source is mounted on a vehicle and includes an extensible/retractable arm having a hook at a distal end, wherein the hook engages the deployed aerial optical fiber cable and conducts mechanical vibrations generated by the mechanical vibration source to the aerial cable.

\* \* \* \* \*